UNITED STATES PATENT OFFICE.

HENRY SIDNEY SMITH, OF NEW YORK, N. Y., AND GEORGE O. CURME, JR., OF PITTSBURGH, PENNSYLVANIA, ASSIGNORS TO THE PREST-O-LITE CO., INC., OF NEW YORK, N. Y., A CORPORATION OF NEW YORK.

SOLVENT FOR ACETYLENE GAS AND THE LIKE.

1,332,525.   Specification of Letters Patent.   Patented Mar. 2, 1920.

No Drawing.   Application filed August 13, 1918.   Serial No. 249,676.

*To all whom it may concern:*

Be it known that we, HENRY SIDNEY SMITH, a subject of the Kingdom of Great Britain, and GEORGE O. CURME, Jr., a citizen of the United States, residing at New York, in the county and State of New York, and Pittsburgh, county of Allegheny, and State of Pennsylvania, respectively, have invented certain new and useful Improvements in Solvents for Acetylene Gas and the like, of which the following is a full, clear, and exact description.

This invention relates to improvements in solvents for acetylene gas and the like.

It is well known that liquid acetone will dissolve many times its own volume of acetylene gas, and that, in order to avoid explosions of the gas, it is desirable to completely fill the cylinder or container, which is charged with the acetone solution of acetylene, with a porous solid such as a mixture of asbestos fiber, charcoal, kieselguhr, and an adhesive material, for example cement; the mixture being introduced into the container in a plastic condition through a valve-opening or the like, or by other suitable method, and allowed to "set" or solidify and be dried before the acetone is introduced into the container, so as to make the latter ready for the introduction of acetylene gas under high pressure. The drying may be promoted by artificial means and should be thorough. Such a mixture as has been described is desirable for use as a "filler" because of its porous character when solidified; approximately 80% of the cubical contents of the container when so filled consisting of the "voids" or cellular spaces in the mass, although the plastic composition is introduced into the container until the latter is apparently completely filled. Nevertheless, the inter-cellular spaces are so small and so completely separated from each other that the tendency of the acetylene gas, when heated to propagate an explosion throughout the container is entirely overcome, or the explosion is so completely confined to a minute area as to be harmless.

But the use of cement, such as Portland or hydraulic cement, while desirable for many reasons for the purpose stated, has been found to be seriously objectionable because most brands of cement contain some free lime; and this, if in appreciable quantities, causes a reaction in the acetone whereby it is in part converted into other compounds which have a lower capacity to dissolve acetylene. Efforts have been made to eliminate free lime from cement, but they have not been satisfactory for the ends now under consideration; others have endeavored to overcome the objection stated by introducing into the cement a substance such as zinc chlorid or zinc sulfate, which will react with the lime to render it inocuous to the acetone; but this too is not free from objection.

Our invention is designed to introduce into the acetone itself (or other solvent which is also sensitive to free alkali) a substance which does not appreciably alter its valuable property of dissolving acetylene abundantly, and which will avoid or counteract any effect of the free lime contained in the cement upon the acetone; that is, by the use of our invention, free lime if initially present in the filler will not act upon the acetone.

In carrying out our invention we add to the acetone a small quantity of ethyl acetate, which will attack and eliminate the free lime, if any, in the filler before the lime breaks down the acetone. This reaction may be expressed by the equation:

$$Ca(OH)_2 \text{ plus } 2CH_3CO.OC_2H_5 \text{ produces } Ca(OCOCH_3)_2 \text{ plus } 2C_2H_5OH$$

Thus ethyl acetate eliminates the undesirable free lime with formation of calcium acetate and ethyl alcohol—both harmless and inert substances in the system under consideration, in the quantities which can possibly occur. Any other ester of an organic acid which is miscible with acetone may be substituted for ethyl acetate.

We have found it desirable to add to the acetone the same percentage, by weight, of ethyl acetate or its equivalent, that the free lime bears to the cement. For example, a filler for a standard acetylene gas container such as is now used may be composed of—

8 lbs. 8 oz. of Portland cement.
8 lbs. 8 oz. of kieselguhr.
15 oz. of asbestos fiber.
27 lbs. 16 oz. of water.
1 cubic foot of charcoal.

The filler, after insertion in the tank is allowed to harden, and is dried. The process may be completed by heating, before the gas solvent is added and the tank is charged. It is very desirable in practice that the tank and filler be thoroughly dried before adding the acetone. If the cement contains one per cent. of free lime; i. e., about 1.4 oz., we would add about 3.5 oz. of ethyl acetate or its equivalent to the acetone. This may be done before or after the acetone is poured into the tank.

We do not limit ourselves to the proportions stated, for the amount necessary or desirable may vary in different cases, as based upon an ascertainment or estimate of the amount of free lime to be neutralized or eliminated in the filler.

It is obvious that the invention is not limited to containers for acetylene only, but may be applied to use with other gas packages containing acetone or like solvent.

What we claim as our invention is:

1. As a solvent for acetylene gas and the like, acetone containing an ester of an organic acid miscible therewith.

2. As a solvent for acetylene gas and the like, acetone containing ethyl acetate.

3. A solvent for acetylene gas and the like comprising acetone containing approximately one per cent. by weight of an ester of an organic acid miscible therewith.

4. A solvent for acetylene gas and the like comprising acetone containing one per cent. by weight of ethyl acetate.

5. A dispensing device for acetylene gas or the like under pressure, comprising within a pressure-tight container, a porous filling containing a cement normally including free lime, and a solvent carried in said porous filling and comprising acetone and an ester of an organic acid, which ester is readily miscible with acetone.

6. A dispensing device for compressed acetylene or the like, which comprises within a pressure-tight container a porous filling material containing a cement normally containing free lime, and a liquid carried in said porous filling comprising a liquid which is a good solvent for acetylene, and in addition thereto an ester of an organic acid, which ester is readily miscible with said solvent.

7. A package for compressed acetylene or the like, which comprises within a pressure-tight container, a porous filling containing Portland cement and a solvent comprising acetone and ethylacetate.

8. In a dispensing device for compressed acetylene gas or the like, a porous substance normally containing free lime, and a liquid solvent for gas containing a substance soluble in said solvent liquid which is capable of reacting with such free lime to render the same innocuous to said solvent.

9. A dispensing device for acetylene gas or the like, comprising within a closed pressure-tight container, a porous mass substantially filling said container, and containing a cementing agent of which free base is a normal constituent, and a liquid associated with such filling, said liquid comprising a liquid which is capable of dissolving large quantities of acetylene, and a substance dissolved therein which has the power of reacting with such free base to produce a product which is inert to said solvent.

10. A filling material for acetylene receptacles, such material comprising a highly porous mass bonded by a cementing agent normally containing a free alkaline oxid, which mass is permeated with a solvent comprising acetone and an ester of an organic acid.

11. A filling material for acetylene receptacles, such material comprising a highly porous mass bonded by a cementing agent normally containing a free alkaline oxid, which mass is permeated with a solvent comprising acetone and an ester of acetic acid.

12. A filling material for acetylene receptacles, such material comprising a highly porous mass bonded by a cementing agent normally containing a free alkaline oxid, which mass is permeated with a solvent comprising acetone and ethyl acetate.

13. A filling material for acetylene receptacles, such material comprising a highly porous mass bonded by a cementing agent normally containing a free alkaline oxid, which mass is permeated with a solvent comprising acetone and a liquid miscible therewith which is capable of rendering such alkaline oxid innocuous to acetone.

14. A filling material for acetylene receptacles, such material comprising a highly porous mass bonded by Portland cement, which mass is permeated with a solvent comprising acetone and a liquid soluble in acetone which is capable of rendering the free lime content of the cement inert to acetone.

15. A process of storing acetylene, which comprises passing the same under pressure into contact with a filling material bonded by means of a cementing agent normally containing free lime, said filling being impregnated with a solvent comprising acetone and a liquid miscible therewith, which is capable of rendering the free lime content of the cement inert to acetone.

16. A process of storing acetylene, which comprises passing the same under pressure into contact with a filling material bonded by Portland cement, said filling containing a solvent for acetylene comprising acetone and an acetic ester.

In testimony whereof we hereunto affix our signatures.

H. SIDNEY SMITH.
GEORGE O. CURME, Jr.